Oct. 23, 1934.  R. E. OLSON  1,977,738
HEAT REGULATOR FOR HEAT EXCHANGE SYSTEMS
Filed Jan. 22, 1932
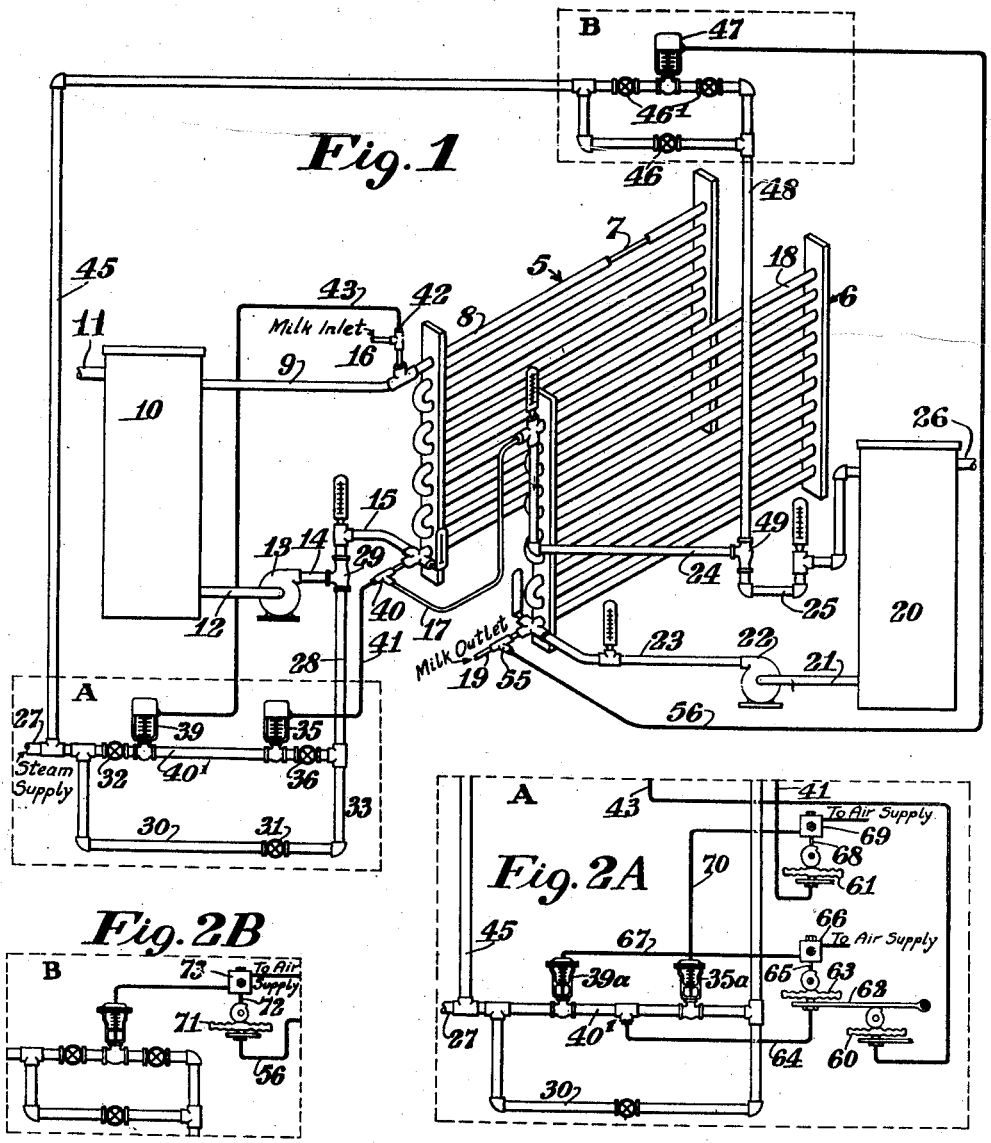
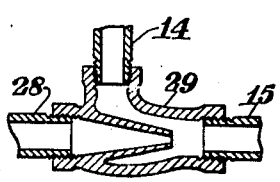
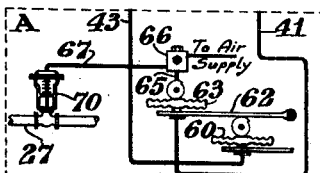
INVENTOR
RAYMOND E. OLSON
BY D. Clyde Jones
ATTORNEY Patented Oct. 23, 1934

1,977,738

UNITED STATES PATENT OFFICE 1,977,738

HEAT REGULATOR FOR HEAT EXCHANGE SYSTEMS

Raymond E. Olson, Rochester, N. Y., assignor to Taylor Instrument Companies, Rochester, N. Y., a corporation of New York Application January 22, 1932, Serial No. 588,149

15 Claims. (Cl. 257—2)

This invention relates to means for regulating the amount of heat introduced into heat exchange systems.

In the preparation of certain products, notably in the pasteurization of milk, it is required that the product be kept at a constant desired temperature for a predetermined period of time. The present invention is especially adapted for use in such milk pasteurizing systems wherein milk flows in heat exchange relation to a heated circulating medium, although it is not limited to this use. In systems of this type, it is important that the temperature of the milk be kept at a predetermined value, which must be maintained in spite of wide variations in the rate of the flow of the milk and in spite of extreme variations in temperature of the incoming milk. Up to the present time, no simple inexpensive system has been provided for supplying heat to the circulating heating medium in an amount just sufficient to satisfy the heat requirements for the milk, especially if there is an abrupt change in the rate of flow of the milk or an abrupt change in the temperature of the milk introduced into the heat exchange system.

The main features of the present invention includes a novel arrangement for regulating the amount of heat introduced into a heat-exchanging medium in accordance with the requirements necessary to maintain the liquid to be heated at a predetermined critical temperature, irrespective of its rate of flow through the heat exchange system and irrespective of the temperature at which it is supplied to the heater.

A further feature of the invention relates to the use of self-acting regulators for controlling the admission of a heating medium into the circulating system of a heat exchanger whereby a simple and inexpensive control arrangement is provided.

For a clearer understanding of the invention reference is made to the drawing in which Fig. 1 diagrammatically represents a two-stage milk heater, together with the circulating systems for these heaters and the regulating devices for controlling the admission of the heating medium into the circulating systems; Figs. 2A and 2B are diagrammatic showings of portions of a modified arrangement for regulating the introduction of heat into the circulating system of the first stage of the heating system and may be substituted for the corresponding portions of Fig. 1 shown within the broken line rectangles; Fig. 3 is a diagrammatic showing of a portion of a further modified form of the invention; and Fig. 4 is a cross-sectional view of a well-known form of mixing T suitable for use in the system of Fig. 1.

Referring to Fig. 1, 5 designates a primary stage of a heat exchanger or milk heating unit, while 6 designates a secondary stage of a heat exchanger or milk heating unit connected in series therewith. It is well-known that each such heat exchanger includes a plurality of coils of pipe 7 for the circulation therethrough of milk, which coils are surrounded by jacketing coils 8 in which heated water or other heating medium is circulated in heat exchange relation to the milk or other fluid to be heated within coils 7. The jacketing coils are connected in a circulating system including a conduit 9, joined to the upper end of these coils, a water circulating tank 10 having an overflow outlet 11, conduit 12, circulating pump 13, conduit 14, mixing T 29 and conduit 15 connected to the lower end of these coils. A supply of milk, pumped from a supply tank (not shown) in the well-known manner, is introduced into the coils 7 through the inlet 16. The milk after passing through these coils is introduced through the conduit 17 into the circulating coils similar to those shown at 7 but enclosed within the water jacketing coils 18 of the secondary heater 6. After passing through the coils of the secondary heater, the milk emerges through the outlet 19 from which it is conducted to other devices in accordance with the well-known practice. The jacketing coils 18 are similarly supplied with heated water or other heating medium by being connected in a circulating system including the water circulating tank 20, conduit 21, pump 22, conduit 23, thence into the lower end of the jacketing coils 18 and from the upper end of these coils, through conduit 24, mixing T 49 and conduit 25 into the upper end of the circulating tank. This tank as in the case of tank 10 is provided with an overflow outlet 26.

For the purpose of maintaining the water or other circulating medium within the circulating systems of the heater units at a predetermined temperature, means are provided for supplying heat in the form of steam to both of these systems from steam supply line 27, in amounts just sufficient to maintain the milk emerging from the heaters at exactly the desired predetermined temperatures. The steam for the primary heating stage passes from the steam supply pipe 27 through conduit 40' including therein the self-acting regulating valves 39 and 35, connected in series, into conduit 28 and thence through mixing T 29 into the circulating system so that the steam introduced into the conduit 28 from the steam supply line 27 is regulated at two stages in the conduit 40'. The self-acting regulating valve 39 is controlled by a thermo-sensitive bulb 42 in the milk inlet of the heater 5, which bulb is connected by the capillary tube 43 to the actuating top of this valve. Valve 39 is thus responsive to the variations in temperature of the milk introduced into the primary heater unit to regulate the pressure of the steam furnished from supply pipe 27 to valve 35. The opening and closing of the self-acting regulating valve 35, on the other hand, is controlled by a thermo-sensitive bulb 40 in the milk outlet of the primary heater unit 5, which bulb is connected by capillary tube 41 to the actuating top of this valve.

It should be understood that in any type of self-acting regulating valve, the movement of its valve disc is proportional to the increase or decrease of the temperature to which its thermo-sensitive bulb is subjected. It follows then that in the case of a milk heater controlled by a single self-acting regulating valve having its thermo-sensitive bulb in the outlet, when the incoming milk temperature is increased say from 40° F. to 130° F., the position of the valve disc of that valve must change to pass less steam. But since the valve has been set to bring milk having an initial temperature of 40° F. to the desired temperature it is evident that with an initial temperature of 130°, too much steam will be admitted and that under the new load condition the milk will be maintained at a higher temperature in the outlet portion of the primary heater than when the incoming milk temperature is maintained consistently at 40° F. In other words, a simple self-acting regulating valve of the conventional type is incapable of maintaining a constant output milk temperature in a pasteurizer, under the varying load conditions usually encountered in service.

However, the combined use of two self-acting temperature regulating valves 39 and 35 inserted in series into the steam inlet pipe 27 make it possible to maintain a uniform temperature of the milk at the outlet of the primary heater, even with a large change of incoming milk temperature. The bulb of the regulating valve 35 is installed in the milk outlet line and determines the position of its valve disc, so that under conditions of constant flow and inlet temperature the milk leaves the primary heater at a substantially uniform temperature. The purpose of using the self-acting regulating valve 39 with the control bulb thereof in the milk inlet line ahead of the regulating valve 35 just described, is to sense load changes and to change the pressure of the steam at the inlet of this last-mentioned valve in proportion to the change in the inlet milk temperature so that it may be unnecessary for the valve disc of valve 35 to change its position in order to maintain constant the temperature of the outflowing milk. However, when a change in the rate of milk flow causes a change in the outlet milk temperature, valve 35 will assume a new position.

It will therefore be appreciated that the regulating valve 39 serves essentially as a pressure reducing valve actuated by the temperature of the incoming milk for the purpose of making it possible for the regulating valve 35 to maintain a constant temperature regardless of the incoming milk temperature changes. For example, with the regulating valve 35 half open 75 lbs. of steam at its inlet may be required to raise the temperature of the milk from 40° F. to 145° F. at a certain rate. When the incoming milk temperature has been increased to 130° F., possibly steam pressure of only 45 lbs. is necessary at the inlet valve 35, in order to produce the necessary flow of steam therethrough to heat this same quantity of milk to the same final temperature of 145° F.

Steam for the second heating stage passes from the steam supply pipe 27 through the conduit 45 including the self-acting regulating valve 47, conduit 48, mixing T 49 and thence into the circulating system. The top of the self-acting regulating valve 47 is connected by capillary tube 56 to a bulb 55 in the outlet of the second heating stage, and this valve is therefore actuated in accordance with the temperature of the milk flowing from the secondary stage, to control the amount of heat introduced in the circulating system thereof.

In connection with the means for introducing steam into the primary circulating system, there is provided a bypass conduit 30, connected about conduit 40', which is opened and closed by a hand valve 31 in the event that it is desired temporarily to disable the regulating valves 35 and 39 from controlling the introduction of steam into the circulating system of the primary heating stage. In such an event the hand valves 32 and 36 are closed while the hand valve 31 is opened so that the steam now flows through the bypath 30 instead of through conduit 40'. A similar bypath controlled by the hand valve 46 bypasses the steam about the regulating valve 47 when the hand valves 46¹ are closed.

In Figs. 2A and 2B there are illustrated compressed air operated regulating valves and related equipment which may be substituted for the self-acting regulating valves shown in Fig. 1, to constitute a modified form of the invention. In this modification, the primary and secondary heating stages as well as the water circulating system therefor may be identical with that shown in Fig. 1, but the regulating mechanism diagrammatically indicated within the dotted rectangle A is replaced by the equipment illustrated within the dotted rectangle A of Fig. 2A, while the regulating apparatus diagrammatically indicated within the dotted rectangle B is replaced by the corresponding regulating equipment indicated within the dotted rectangle B of Fig. 2B.

In this modified arrangement, the capillary 43 connects the thermosensitive element or bulb 42 in the milk inlet of the primary heater stage to the capsular element 60 of a differential regulator, while the capillary 41 connects the thermosensitive element 40 in the milk outlet of this heater stage to a capsular diaphragm 61. The capsular diaphragm 60 in response to a change in temperature, varies the position of the pivoted arm 62, which carries the capsular diaphragm 63 connected by a steam conduit 64 to a point in the pipe 40' between the regulating valves 39a and 35a. Thus in response jointly to changes in the temperature of the incoming milk to the primary heater and in response to steam pressure in the capillary 64, the diaphragm 63 actuates the tappet 65 in pilot air valve 66 to vary the flow of air pressure in conduit 67 leading to the top of the regulating valve 39a from the air supply source. In response to the outlet temperature of the milk from the primary heating stage, capsular diaphragm 61 actuates the tappet of pilot valve 69 which varies the flow of pressure in the conduit 70 leading to the top of the actuating valve 35 from the air supply source. As in the arrangement of Fig. 1, the valves 35a and 39a are responsive to the inlet and outlet temperatures of the milk in the primary heater to control the introduction of steam or other heating medium into the primary circulating system thereof.

In this modification also, the introduction of steam or other heating medium into the secondary circulating system is controlled by the thermosensitive element or bulb 55 in the milk outlet of the secondary heater stage, which bulb is connected by capillary 56 to capsular diaphragm 71. This diaphragm engages tappet 72 of a pilot valve 73 which serves to regulate the flow of air pressure through the conduit 74 to the top of the regulating valve 47 from the air supply source.

A portion of a further modified form of the invention is diagrammatically illustrated in Fig. 3, which portion may be substituted for that portion of Fig. 1 represented within the dotted rectangle A. This modification differs from that illustrated in Fig. 2A by utilizing a single regulating valve 70, in the steam supply line 27, actuated in accordance with the inlet and outlet temperatures of the milk at the primary heater stage to control the amount of heat in the form of steam introduced into the circulating system of this heater stage. In this instance also, the conduit 43 connected to the thermosensitive bulb 42 at the inlet of the primary heater, actuates the capsular diaphragm 60 to vary the position of the pivoted arm 62. This arm at its free end carries a capsular diaphragm 63 which is connected by the capillary 41 to a thermosensitive element 40 in the milk outlet of the primary heater stage. The capsular diaphragm 63 by having its position changed by the operation of the arm 62, in response to inlet temperature and by its own expansion and contraction actuates the tappet 65 of the pilot valve 66. This pilot valve controls a conduit leading from the actuating top of the regulating valve 70 to a source of fluid pressure and therefore regulates the amount of fluid pressure applied to the top of this valve. It will thus be seen that in this last-mentioned arrangement, a single valve regulated in accordance with the inlet and outlet temperature of the milk at the primary heater stage, controls the amount of steam and therefore the amount of heat introduced into the circulating system of the primary heater.

I claim:

1. The method of heating a circulating liquid to a predetermined temperature irrespective of its initial temperature and irrespective of its rate of flow, which comprises circulating a heating medium in heat exchange relation to said liquid and introducing heat into said heating medium in amounts determined in accordance with the temperatures of the liquid at two different points therein.

2. The method of heating a circulating liquid to a predetermined temperature irrespective of its initial temperature and irrespective of its rate of flow, which comprises circulating a heating medium in heat exchange relation to said liquid and introducing heat through a single path into said medium in amounts determined in accordance with the temperature of the liquid at two different points therein.

3. The method of heating a circulating liquid to a predetermined temperature irrespective of its initial temperature and irrespective of its rate of flow which comprises circulating a heating medium through a path in heat exchanging relation to said liquid and introducing heat into said heating medium in accordance both with the temperature of said liquid at the beginning and with the temperature at the end of said path.

4. The method of heating a circulating liquid to a predetermined temperature irrespective of its initial temperature and irrespective of its rate of flow which comprises circulating a heating medium in heat exchange relation to said liquid, and introducing heated vapor into said heating medium in amounts regulated at two points, the regulating at one point being in accordance with the temperature of the incoming liquid and the regulation at the second point being in accordance with the temperature of the liquid after it has been subjected to heat exchanging relation with said heating medium.

5. The method of heating a circulating liquid to a predetermined temperature irrespective of its initial temperature and irrespective of its rate of flow which comprises circulating said liquid through a path in heat exchanging relation to a circulating heating medium and introducing steam into said medium, controlling the flow of the introduced steam by the temperature of said liquid near the inlet to said path and by the temperature of said liquid near the outlet of said path.

6. The method of heating a circulating liquid to a predetermined temperature irrespective of its initial temperature and irrespective of its rate of flow which comprises circulating a heating medium in heat exchanging relation to said liquid, and regulating the introduction of heat into said heating medium in two different stages, one of said stages compensating for variations in temperature of incoming liquid and the second stage compensating for variations in temperature due to variations in flow of said liquid during the heat exchanging relation.

7. In apparatus of the class described, a heat exchanger including a passage for the liquid to be heated and a passage in heat exchange relation thereto for a heating medium, a circulating system including said last-mentioned passage and means including a plurality of regulating devices controlled in accordance with the temperature at two points in said liquid for regulating the amount of heat introduced into said circulating system.

8. In apparatus of the class described, a heat exchanger including a passage for the liquid to be heated and a passage in heat exchange relation thereto for a heating medium, a circulating system including said last-mentioned passage, a thermosensitive element in said liquid passage near the inlet thereof and a thermosensitive element in said liquid passage near the outlet thereof, and valve means actuated by said thermosensitive elements to control the admission of heat into said circulating system.

9. In apparatus of the class described, a heat exchanger including a passage for the liquid to be heated and a passage in heat exchange relation thereto for a heating medium, a circulating system including said last-mentioned passage, a thermosensitive element in said liquid passage near the inlet thereof and a thermosensitive element in said liquid passage near the outlet thereof, and means including valves actuated by said thermosensitive elements to control jointly the admission of heat into said circulating system.

10. In apparatus of the class described, a heat exchanger including a passage for the liquid to be heated and a passage in heat exchange relation thereto for a heating medium, a circulating system including said last-mentioned passage, a steam conduit connected to said circulating system for introducing steam therein, a plurality of regulating valves controlling the flow of steam through said conduit, and means including a plurality of thermosensitive elements in said liquid passage for controlling the operation of said valves.

11. In apparatus of the class described, a heat exchanger including a passage for the liquid to be heated and a passage in heat exchange relation thereto for a heating medium, a circulating system including said last-mentioned passage, a steam pipe connected to said circulating system, a primary valve and a secondary valve connected in said steam pipe for controlling the admission of steam therethrough into said circulating system, a capsular element connected by a conduit leading into said steam pipe at a point between said valves, a conduit having a pilot valve therein controlling the flow of fluid pressure to actuate said first-mentioned valve, said pilot valve being actuated by said capsular diaphragm, a second capsular diaphragm for varying the relation between said first capsular diaphragm and said valve, and means including a thermosensitive element in the liquid passage near the inlet thereof for actuating said second diaphragm and means in said liquid passage near the outlet thereof for controlling the actuation of said second valve.

12. The method of treating a liquid that is to be heated to a predetermined temperature which comprises circulating a heating liquid in heat exchange relation to the liquid to be heated and introducing heat into said heating liquid in accordance with the temperatures of one of said liquids at two different points therein.

13. The method of heating a liquid of varying initial temperature and/or varying rate of flow to a predetermined temperature, which comprises causing the heating liquid to flow through a heat exchange area, causing the liquid to be heated to flow through said heat exchange area, developing responses in accordance with the changes in temperature at two spaced points in one of said liquids as it passes through a portion of said heat exchange area, and introducing heat into said heating liquid in amounts proportional to said responses.

14. In apparatus of the class described, a heat exchanger including a passage for liquid to be heated and a passage in heat exchange relation thereto for a heating liquid, two heat sensitive elements extending into one of said passages at points spaced from one another and means for introducing heat into said heating liquid in accordance with the responses of said heat sensitive elements.

15. In a heat exchange system, a heater having a passage for liquid to be heated and a passage for heating liquid in heat exchange relation thereto, a thermosensitive element extending into one of said passages near the entrance thereto, a thermosensitive element extending into said last mentioned passage near the outlet thereof, and means actuated by the joint responses of said thermosensitive elements for controlling the admission of heat to said heating liquid passage.

RAYMOND E. OLSON.